United States Patent [19]

Beadman et al.

[11] Patent Number: 5,700,098

[45] Date of Patent: Dec. 23, 1997

[54] PRINTING DEVICE

[75] Inventors: Michael Andrew Beadman; Ian Thompson-Bell, both of Herts, United Kingdom

[73] Assignee: Esselte N.V., St. Niklaas, Belgium

[21] Appl. No.: 545,446

[22] Filed: Oct. 24, 1995

Related U.S. Application Data

[63] Continuation of Ser. No. 94,660, Jul. 20, 1993, abandoned.

[30] Foreign Application Priority Data

Jul. 24, 1992 [GB] United Kingdom .................. 9215740

[51] Int. Cl.⁶ ....................................................... B41J 11/44
[52] U.S. Cl. ........................ 400/615.2; 400/692; 395/114
[58] Field of Search ........................ 400/61, 76, 615.2, 400/692; 395/114, 115

[56] References Cited

U.S. PATENT DOCUMENTS

| | | | |
|---|---|---|---|
| 4,826,332 | 5/1989 | Ukai et al. | 400/61 |
| 4,836,697 | 6/1989 | Plotnick et al. | 400/615.2 |
| 4,926,347 | 5/1990 | Uchida et al. | 400/61 |
| 5,044,790 | 9/1991 | Kawamura | 400/121 |
| 5,083,286 | 1/1992 | Hino et al. | 395/115 |
| 5,149,211 | 9/1992 | Pettigrew | 400/88 |
| 5,287,434 | 2/1994 | Bain et al. | 395/115 |
| 5,322,378 | 6/1994 | Ikeda et al. | 400/68 |
| 5,595,450 | 1/1997 | Beadman et al. | 400/615.2 |

FOREIGN PATENT DOCUMENTS

| | | | |
|---|---|---|---|
| 0 297 568 | 1/1989 | European Pat. Off. | G06F 3/12 |
| 0 317 996 A2 | 5/1989 | European Pat. Off. | G06F 3/12 |
| 0 481 518 A2 | 4/1992 | European Pat. Off. | G06K 15/02 |
| 2 161 005 | 1/1986 | United Kingdom | G06K 15/02 |

*Primary Examiner*—Edgar S. Burr
*Assistant Examiner*—Steven S. Kelley
*Attorney, Agent, or Firm*—Pennie & Edmonds LLP

[57] ABSTRACT

A printing device is described which can provide extended functions while nevertheless remaining portable and inexpensive. This is achieved by providing an interface which is connected to a controller of the printing device and which is adapted to be connected to one of a selection of external cartridges to support a wider variety of functions of the printing device.

20 Claims, 1 Drawing Sheet

PRINTING DEVICE

This is a continuation of application Ser. No. 08/094,660 filed Jul. 20, 1993, now abandoned.

FIELD OF THE INVENTION

The present invention relates to a printing device and is particularly concerned with a label printing device.

BACKGROUND TO THE INVENTION

Such printing devices are described for example in EP-A-0322918 (Brother Kogyo Kabushiki Kaisha) and EP-A-0267890 (Varitronics, Inc.). They operate with a supply of tape arranged to receive an image and a means for transferring an image onto the tape. The printing device has a keyboard for entering data generally in the form of characters to be transferred onto the tape and a display for displaying the data input via the keyboard. The printing device has a controller for receiving the data input from the keyboard and for controlling the display to display the input data and also to control printing means for transferring the image onto the tape. The controller is also responsible for controlling feeding of the tape as it is printed and, optionally, cutting of the tape to form labels.

Printing devices of this type are made to be small and light so that they are portable and have been found to be extremely useful and convenient for printing labels in any type of environment. One aspect of the printing device affecting its portability and also its price is the capacity of the controller in the printing device. Users are now requiring quite sophisticated functions of printing devices of this type while nevertheless still requiring them to remain portable and inexpensive. The present invention seeks to provide a solution to these problems.

SUMMARY OF THE INVENTION

According to the present invention there is provided a printing device comprising:

input means for inputting information for controlling operations of the printing device;

a controller coupled to the input means to receive control signals therefrom and operable to utilise said control signals to provide address signals for accessing data items to be printed and control data for controlling operations of the printing device; and an interface connected to the controller via at least an address bus, a data bus and a control bus and having an address connection port, a data connection port and a control connection port adapted for connection to respective corresponding ports of an external cartridge whereby said external cartridge can supplement the operations of the controller.

The printing device can thus be used in combination with an external cartridge which can be selected from a group of external cartridges having respective different functions. One external cartridge can comprise memory which can be accessed under the control of addresses converted from the input control signals by the controller and supplied to the external cartridge via the address bus and address connection port. The memory can be static RAM for the storage of particular labels or read only memory (ROM) containing revised or additional program for operating the printing device. In the case of static RAM the cartridge will have a small battery to maintain the contents of the RAM during a power down or disconnection from the printing device. An external cartridge having ROM can also be used for the storage of permanent information such as permanent company logos or for the storage of font data for different characters. Thus, while the controller can itself have memory capacity for the storage of a particular font, this capacity can be easily extended by use of an external memory cartridge. Thus, different fonts can conveniently be supplied by an external cartridge without requiring the controller of the printing device itself to have a large memory capability. This enables the size and cost of the controller itself to be minimised. The capability to provide a larger memory is particularly useful for the storage of Chinese and Asian fonts where a large storage capability is required.

Preferably the printing device further comprises a latch for the storage of address bits in addresses supplied by the controller responsive to the input control signals, which bits exceed the capacity of the address bus. The interface is coupled to the latch to receive these extra address bits along auxiliary address lines so that an external cartridge can be accessed with addresses which have more bits than are available on the address bus linking the controller and the interface. This has a particular advantage when the external cartridge is used to store Kanji fonts which can require up to 512 Kilobytes storage capacity for characters and their associated manipulation program code. This thus enables the printer to be used in a sophisticated manner without an increase in cost to the basic printing device.

Preferably the interface also has a serial communications port which is coupled to a serial communications port of the controller to permit serial communications with an external personal computer or terminal. The software support required to support the serial communication can then be provided in an external cartridge connected to the interface and including the appropriate program stored in ROM.

For a better understanding of the present invention, and to show how the same may be carried into effect, reference will now be made by way of example to the accompanying drawings.

DESCRIPTION OF THE PREFERRED EMBODIMENT

Figure 1:
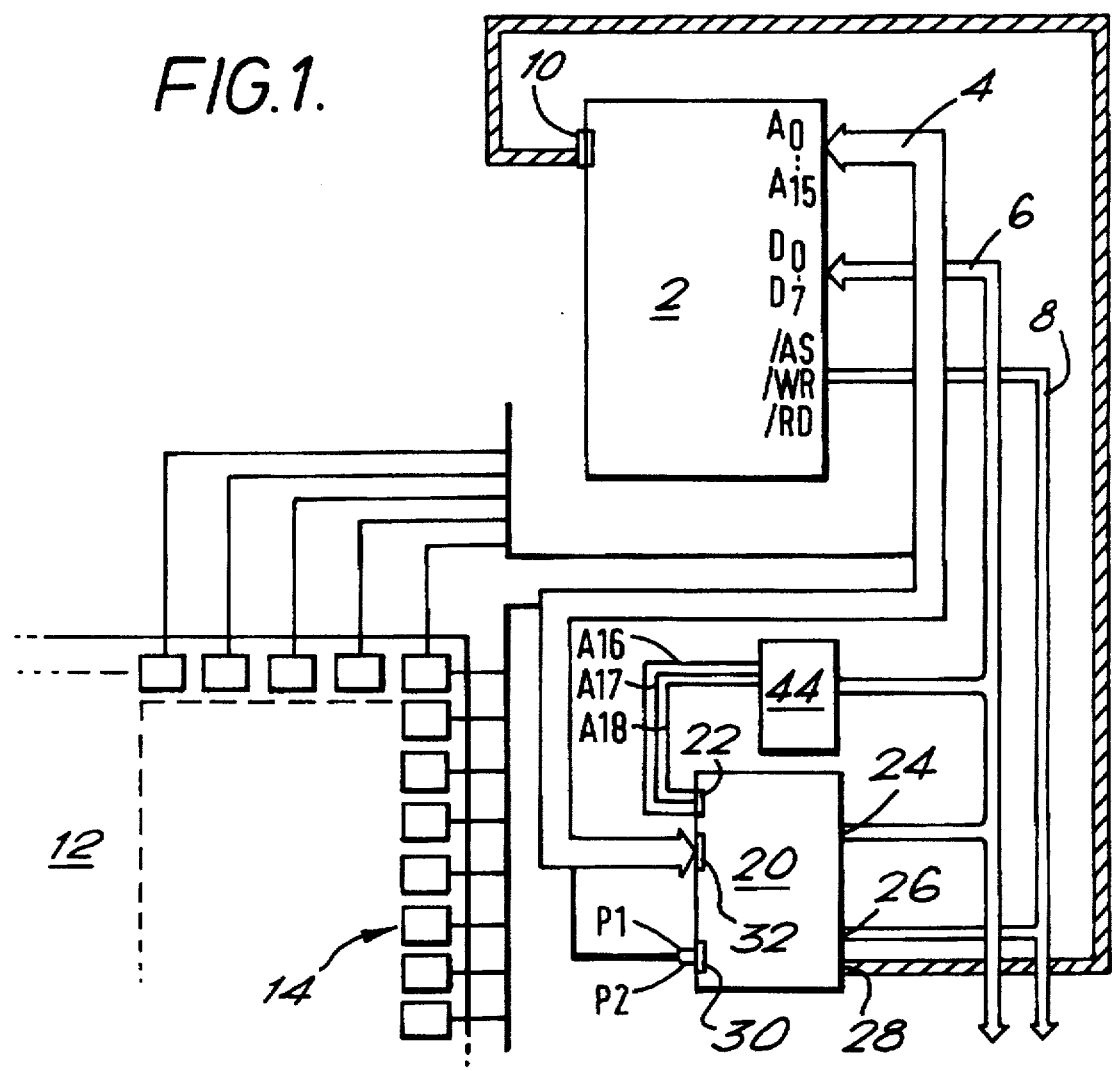
FIG. 1 is a block diagram showing the functional blocks of a printing device.

Referring now to FIG. 1, a printing device comprises a controller 2 which is for example an H8/325 device comprising a microprocessor and memory capacity made up of 32K of ROM and 1K of RAM. The processing capability of the processor is such that the controller 2 can access up to 64K of memory. The controller 2 has connection pins $A_0$ to $A_{15}$ for supplying signals to and from a 16-bit address bus 4 connected to the controller 2. The controller also has data pins $D_0$ to $D_7$ for supplying data to and from an 8-bit data bus 6 connected to the controller. The controller further has control lines /AS, /WR and /RD which are connected to a control bus 8. The controller further has a serials communications port 10 which can permit serial communications up to 19200 baud according to computer standards.

The printing device also has input means in the form of a keyboard 12 having a plurality of keys designated generally by a block 14. The keyboard 12 is coupled to supply signals to the address bus. Depression of the keys on the keyboard causes signals to be supplied onto the address bus 4 by means of which signals are supplied to the controller 2. The controller decodes the control signals from the keyboard 14 to produce addresses to access memory locations so as to supply data and control signals to control operations of the printing device in accordance with the functions selected by the user.

The printing device also has an interface 20. The interface 20 is connected to the controller 2 via its address bus 4, data bus 6 and control bus 8. The interface 20 is also connected to the controller via the serial communications port 10. For external connections, the interface provides an address connection port 32 connected to the address bus 4, a data connection port 24 connected to the data bus 6, a control connection port 26 connected to the control bus 8, a serial communications connection port 28 and a functions connection port 30. The interface also provides an auxiliary address connection port 22 the purpose of which will be described in more detail hereinafter.

The printing device also has a latch 44 which is connected to the data bus 6 to receive data from the controller 2 and which has three auxiliary address lines A16,A17,A18 which are connected to the auxiliary address connection port 22 of the interface 20.

The controller is also connected via its buses 4,6,8 to a display driver to control a liquid crystal display, to a stepper motor for controlling feeding of the tape which is being printed, a print head for controlling the image to be printed onto the tape, a power supply unit and a cutting mechanism. Of these, only the print head portion of the printing mechanism is shown because they do not form part of the present invention and in any event are described in copending application Ser. No. 08/071,120 (Page, White & Farrer Ref. 73546), the contents of which are incorporated by reference.

Figure 2:
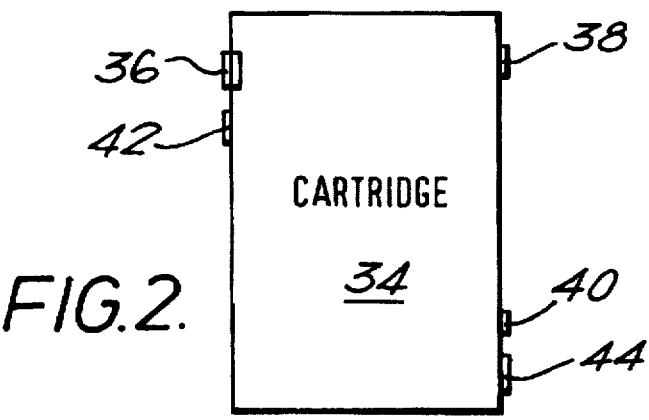
FIG. 2 is a sketch of an external cartridge.

The printing device can be used in association with an external cartridge designated by reference numeral 34 in FIG. 2 which has connection ports corresponding to the connection ports on the interface. That is each external cartridge has an address connection port 36, a data connection port 38 and a control connection port 40. If required, an external cartridge can have an auxiliary address connection port 42 for connection to the auxiliary address connection port 22 of the interface.

The external cartridge 34 can be selected from a set of cartridges depending on the function of the printing device. One such cartridge has battery-backed static random access memory for enabling a label which has been composed using the keyboard and display to be stored so that it can be printed at a later date without requiring reformulation. Another external cartridge comprises static RAM for predetermined and prestored label texts, such as addresses or file indicators frequently required by a company. This means that a user does not have to formulate these each time they are required to be printed. Where the external cartridge comprises static ram, it has a functions connection port 44 capable of cooperating with the functions connection port 30 of the interface.

Another external cartridge includes read only memory which can be adapted to perform a variety of different functions. In one embodiment, permanent company logos are stored. In another embodiment, alternative fonts are stored to enable different characters or types of characters to be printed. In a still further embodiment, revised or additional processor code for the processor of the controller 2 is stored. In a particularly preferred embodiment, this enables a Kanji font to be stored and manipulated using programs stored in the ROM in the external cartridge. Signals input from the keyboard 14 are transferred to the controller 2 which converts them to address data, each address being 19 bits long instead of the conventional 16 bits long. Thus, the address is output on the 16 bit address bus 4 and also on three of the data output lines on the data bus 6 to a memory location decoded as the latch 44. These three address lines A16,A17,A18 are connected to the auxiliary address connection port 22 of the interface and from there to the external cartridge. Thus, the external cartridge "sees" a 19 bit address fed to it across the address connection port 32 and the auxiliary address connection port 22. This enables the addressing capability of the controller to be increased in a simple yet effective manner. The increased addressing capability is supported by programs stored in the ROM of the external cartridge.

As an alternative embodiment, the external cartridge can comprise support software in ROM for a device connected to the serial communications port 28. This means that there is no requirement for the controller to itself be able to support external communications. Thus, when the external cartridge is used, a host computer can take over entire control of the printing device.

When the printing device is started up, the microprocessor is programmed to attempt an access to a particular memory location in an external cartridge. If a cartridge is present which contains program code, the addressed memory location returns details of the type of cartridge which has been attached and the size of memory present. If no cartridge has been connected, or if the cartridge only contains additional memory no recognisable data is returned to the controller and the microcontroller will function as though there is no cartridge. If a RAM only cartridge is present, no data will be identified at the particular memory location but instead the functions connection port 44 of the cartridge is operable to set two pins P1,P2 of the functions connection port 30 of the interface to identify the capacity of the RAM in the cartridge according to the following table.

| P1 | P2 | RAM size |
|----|----|----------|
| 0 | 0 | 32K |
| 0 | 1 | 8K |
| 1 | 0 | 2K |
| 1 | 1 | No RAM |

This information is supplied to the microprocessor over the address bus 4.

What is claimed is:

1. A printing device comprising:

a printing mechanism for printing characters onto an image receiving tape;

an input device for inputting information for controlling operations of the printing device;

a controller coupled to the input device to receive control signals therefrom and operable to utilize the control signals to provide address signals for accessing data items for defining said characters to be printed and control data for controlling operations of the printing mechanism;

an address bus coupled to said controller;

a data bus for supplying said data items to the printing mechanism;

a control bus for supplying the control data to the printing mechanism; and an interface connected to the address bus, the data bus and the control bus and having an address connection port, a data connection port and a control connection port adapted for connection to the respective corresponding ports of an external cartridge, whereby said external cartridge can supplement the operations of the controller, said data bus and said control bus being additionally coupled to said controller, with said input device and said external cartridge being contemporaneously usable with said controller, whereby said controller selectively supplies said data items and said control data to said printing mechanism.

2. A printing device according to claim 1 in combination with a plurality of external cartridges having respective different functions and from which an external cartridge for connection to the interface can be selected.

3. A printing device according to claim 1, wherein the external cartridge comprises memory accessible under the control of addresses converted from the input control signals by the controller and supplied to the external cartridge by the address bus and address connection port.

4. A printing device according to claim 3, wherein the memory is RAM.

5. A printing device according to claim 3, wherein the memory is ROM.

6. A printing device according to claim 1 wherein the interface has a serial communications port which is coupled to a serial communications port of the controller to permit serial communcations with an external terminal.

7. A printing device according to claim 1 wherein a plurality of external cartridges having respective different functions are provided.

8. A printing device according to claim 1, wherein the external cartridge contains additional programs for the printing device.

9. A printing device according to claim 1, wherein the external cartridge can store information entered into the printing device through the input device.

10. A printing device comprising:

a printing mechanism for printing characters onto an image receiving tape;

an input device for inputting information for controlling operations of the printing device;

a controller coupled to the input device to receive control signals therefrom and operable to utilize the control signals to provide address signals for accessing data items for defining said characters to be printed and control data for controlling operations of the printing mechanism;

an address bus coupled to said controller;

a data bus for supplying said data items to the printing mechanism;

a control bus for supplying the control data to the printing mechanism;

an interface connected to the address bus, the data bus and the control bus and having an address connection port, a data connection port and a control connection port;

an external cartridge comprising an address connection port, a data connection port and a control connection port connected respectively to the address connection port, data connection port and control connection port of said interface, said external cartridge comprising memory accessible under the control of addresses converted from the input control signals by the controller and supplied to the external cartridge by the address bus and address connection port, wherein said data bus and said control bus are additionally coupled to said controller, with said input device and said external cartridge being contemporaneously usable with said controller, whereby said data items are supplied to said printing mechanism via said data bus from said external cartridge and said control data is supplied to said printing mechanism from said controller.

11. A printing device comprising:

a printing mechanism for printing characters onto an image receiving tape;

an input device for inputting information for controlling operations of the printing device;

a controller coupled to the input device to receive control signals therefrom and operable to utilize the control signals to provide address signals for accessing data items for defining said characters to be printed and control data for controlling operations of the printing mechanism;

an address bus coupled to said controller;

a data bus for supplying said data items to the printing mechanism;

a control bus for supplying the control data to the printing mechanism;

an interface connected to the address bus, the data bus and the control bus and having an address connection port, a data connection port, a control connection port and a serial communications port;

said data bus and said control bus being additionally coupled to said controller;

an external cartridge having an address connection port, a data connection port and a control connection port connected respectively to the address connection port, data connection port and control connection port of the interface, wherein the serial communications port of the interface is connected to a serial communications port of the controller to permit serial communications with an external terminal of a host computer and wherein said external cartridge contains ROM holding program providing software support for serial communications between the controller and the host computer.

12. A printing device according to claim 11 which comprises a latch for the storage of address bits in addresses supplied by the controller responsive to the input control signals, which bits exceed the capacity of the address bus, wherein the interface is coupled to the latch to receive these extra address bits along auxiliary address lines so that an external cartridge can be accessed with addresses which have more bits than are available on the address bus linking the controller and the interface.

13. A printing device according to claim 11 wherein the input device is connected to said controller via said address bus.

14. A printing device according to claim 11 wherein the input device comprises a keyboard.

15. A printing device according to claim 11, wherein the input device is coupled to the address bus.

16. A printing device according to claim 15, wherein the input device is a keyboard.

17. A printing device comprising:

a printing mechanism for printing characters onto an image receiving tape;

an input device for inputting information for controlling operations of the printing device;

a controller coupled to the input device to receive control signals therefrom and operable to utilize the control signals to provide address signals for accessing data items for defining said characters to be printed and control data for controlling operations of the printing mechanism;

an address bus coupled to said controller;

a data bus for supplying said data items to the printing mechanism;

a control bus for supplying the control data to the printing mechanism;

an interface connected to the address bus, the data bus and the control bus and having an address connection port, a data connection port and a control connection port adapted for connection to respective corresponding ports of an external cartridge whereby said external cartridge can supplement the operations of the controller; and said data bus and said control bus being additionally coupled to said controller;

a latch for the storage of address bits in addresses supplied by the controller responsive to the input control signals, which bits exceed the capacity of the address bus, wherein the interface is coupled to the latch to receive these extra address bits along auxiliary address lines so that an external cartridge can be accessed with addresses which have more bits than are available on the address bus linking the controller and the interface, said input device and said external cartridge being contemporaneously usable with said controller.

18. A printing device comprising:

a printing mechanism for printing characters onto an image receiving tape, said printing mechanism including a motor for feeding said image receiving tape, a print head for printing an image on said image receiving tape and a cutting mechanism;

an input device for inputting information for controlling operations of the printing device;

a controller coupled to the input device to receive control signals therefrom and operable to utilize the control signals to provide address signals for accessing data items for defining said characters to be printed and control data for controlling operations of the printing mechanism;

an address bus coupled to said controller;

a data bus for supplying the data items to the printing mechanism;

a control bus for supplying the control data to the printing mechanism for controlling operations thereof; and an interface connected to the address bus, the data bus and the control bus and having an address connection port, a data connection port, a control connection port and a serial communications port to permit serial communications with an external terminal of a host computer and wherein said device includes memory holding program providing software support for serial communications between the device and the host computer, whereby the host computer can control operation of the printing device.

19. The printing device of claim 18 which further comprises a latch for the storage of address bits in addresses supplied by the controller responsive to the input control signals, which bits exceed the capacity of the address bus, wherein the interface is coupled to the latch to receive these extra address bits along auxiliary address lines so that an external cartridge can be accessed with addresses which have more bits than are available on the address bus linking the controller and the interface.

20. a printing device comprising:

a printing mechanism for printing characters onto an image receiving tape;

an input device for inputting information for controlling operations of the printing device;

a controller coupled to the input device to receive control signals therefrom and operable to utilize the control signals to provide address signals for accessing data items for defining said characters to be printed and control data for controlling operations of the printing mechanism;

an address bus coupled to said controller;

a data bus for supplying said data items to the printing mechanism;

a control bus for supplying the control data to the printing mechanism; and an external cartridge for supplementing the operation of the controller and having an address connection port, a data connection port and a control connection port;

an interface connected to the address bus, the data bus and the control bus and having an address connection port, a data connection port and a control connection port for connection to the respective corresponding ports of said external cartridge, whereby said external cartridge can supplement the operations of the controller, said data bus and said control bus being additionally coupled to said controller, with said input device and said external cartridge being contemporaneously usable with said controller, whereby said controller selectively supplies said data items and said control data to said printing mechanism.

* * * * *